(12) United States Patent
Lin et al.

(10) Patent No.: US 12,407,969 B2
(45) Date of Patent: Sep. 2, 2025

(54) ELECTRONIC DEVICE AND SEALING MECHANISM THEREOF

(71) Applicant: Wistron Corporation, New Taipei (TW)

(72) Inventors: Kou-Shiung Lin, New Taipei (TW); Tat-Yan Chan, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 252 days.

(21) Appl. No.: 18/303,717

(22) Filed: Apr. 20, 2023

(65) Prior Publication Data
US 2024/0223932 A1  Jul. 4, 2024

(30) Foreign Application Priority Data
Dec. 30, 2022 (TW) ................... 111151013

(51) Int. Cl.
*H04R 1/08* (2006.01)
*G06F 1/16* (2006.01)
(Continued)

(52) U.S. Cl.
CPC .......... *H04R 1/086* (2013.01); *G06F 1/1656* (2013.01); *H04M 1/026* (2013.01); *H04M 1/03* (2013.01); *H04R 1/28* (2013.01); *H04R 2499/11* (2013.01)

(58) Field of Classification Search
CPC ...... H04R 1/086; H04R 1/28; H04R 2499/11; G06F 1/1656; H04M 1/026; H04M 1/03;
(Continued)

(56) References Cited

U.S. PATENT DOCUMENTS 4,984,268 A * 1/1991 Brown .................... H04M 1/03
379/433.02
5,836,790 A * 11/1998 Barnett .................. H04M 1/03
439/500
(Continued)

FOREIGN PATENT DOCUMENTS

CN 110462549 A 11/2019
TW 202215857 A 4/2022

OTHER PUBLICATIONS

Examination report dated Jul. 18, 2023, listed in related Taiwan patent application No. 111151013.

*Primary Examiner* — Allen L Parker
*Assistant Examiner* — Martin Antonio Asmat Uceda
(74) *Attorney, Agent, or Firm* — McClure, Qualey & Rodack, LLP

(57) ABSTRACT

An electronic device includes a chassis, a voice receiving unit, an acoustic membrane, and a sealing mechanism. The chassis has a through hole. The sealing mechanism includes a sealing body and a sealing ring. The sealing body has an accommodation portion and a channel. One of two ends of the channel is in communication with the accommodation portion, and the other end has a first opening. The accommodation portion accommodates the voice receiving unit. The sealing ring is between the sealing body and the acoustic membrane, and has a penetration hole. The penetration hole, the through hole and the first opening correspond to each other. A ring hardness of the sealing ring is less than a body hardness of the sealing body.

20 Claims, 17 Drawing Sheets

(51) Int. Cl.
*H04M 1/02* (2006.01)
*H04M 1/03* (2006.01)
*H04R 1/28* (2006.01)

(58) Field of Classification Search
CPC .. C08L 79/02; C08L 79/08; F16J 15/00; F16J 15/40
See application file for complete search history.

(56) References Cited

U.S. PATENT DOCUMENTS

| | | | | |
|---|---|---|---|---|
| 5,915,015 A * | 6/1999 | Thornton | | H04M 1/03 |
| | | | | 379/433.03 |
| 7,548,628 B2 * | 6/2009 | Hawker | | H04R 1/028 |
| | | | | 381/365 |
| 8,032,186 B2 * | 10/2011 | Ryu | | H04M 1/0237 |
| | | | | 455/566 |
| 8,055,003 B2 * | 11/2011 | Mittleman | | H04R 1/023 |
| | | | | 381/387 |
| 8,804,993 B2 * | 8/2014 | Shukla | | H04R 1/34 |
| | | | | 381/189 |
| 8,811,645 B2 * | 8/2014 | Inoda | | H04R 1/32 |
| | | | | 381/357 |
| 9,210,492 B2 * | 12/2015 | Dave | | H04R 1/086 |
| 9,326,057 B2 * | 4/2016 | Lee | | H04R 1/08 |
| 9,408,009 B1 * | 8/2016 | Witte | | H04R 31/00 |
| 9,894,431 B2 * | 2/2018 | He | | H04R 1/083 |
| 10,148,800 B1 * | 12/2018 | Frederickson | | H04M 1/035 |
| 10,819,836 B2 * | 10/2020 | Lim | | H04M 1/035 |
| 10,827,618 B2 * | 11/2020 | Mäki | | H04M 1/18 |
| 10,979,794 B2 * | 4/2021 | Park | | H04N 23/54 |
| 11,147,180 B2 * | 10/2021 | Chou | | H05K 5/04 |
| 11,399,226 B2 * | 7/2022 | Kim | | H04R 31/006 |
| 11,632,448 B2 * | 4/2023 | Baker | | H04M 1/026 |
| | | | | 455/575.1 |
| 11,895,379 B2 * | 2/2024 | Park | | H05K 1/11 |
| 12,088,748 B2 * | 9/2024 | Zhang | | H04N 23/51 |
| 12,225,146 B2 * | 2/2025 | Gillier | | H04M 1/026 |
| 2013/0261202 A1 * | 10/2013 | Cao | | C08L 79/08 |
| | | | | 264/494 |
| 2015/0289042 A1 * | 10/2015 | Yamaguchi | | H04R 1/025 |
| | | | | 381/87 |
| 2021/0352392 A1 * | 11/2021 | Kim | | H04R 1/08 |
| 2022/0286540 A1 * | 9/2022 | Gillier | | H04R 1/023 |
| 2023/0269319 A1 * | 8/2023 | Shim | | H04M 1/0277 |
| | | | | 361/679.01 |
| 2024/0365053 A1 * | 10/2024 | Wu | | H04R 1/025 |

* cited by examiner

ELECTRONIC DEVICE AND SEALING MECHANISM THEREOF

CROSS-REFERENCE TO RELATED APPLICATION

This non-provisional application claims priority under 35 U.S.C. § 119(a) to Patent Application No. 111151013 filed in Taiwan, R.O.C. on Dec. 30, 2022, the entire contents of which are hereby incorporated by reference.

BACKGROUND

Technical Field

The disclosure relates to an electronic device and a sealing mechanism configured a voice receiving unit thereof.

Related Art

With the development of technology, consumers pay increasing attention on light and thin appearances as well as good acoustic quality of electronic products, so that they can have high-quality experiences in using electronic products.

Currently, for assembling an electronic product known to the inventor, a plurality of parts is used, resulting in relatively high production costs. Moreover, a process of assembling the plurality of parts is relatively cumbersome and inconvenient. In addition, because assembling the electronic product requires the plurality of parts, matching positions between the plurality of parts are prone to have misalignments, resulting in poor sealing of the components. Thus, the problem of ambient noise interfering with acoustic performance will easily arise. In addition, during the assembling process, the air tightness becomes poor due to less pressing force; however, if the pressing force is too much, the pressing force will affect the acoustic performance of the electronic product.

SUMMARY

In view of the foregoing problems, the disclosure provides a sealing mechanism and an electronic device including the sealing mechanism.

According to one or some embodiments, the electronic device comprises a chassis, a voice receiving unit, an acoustic membrane, and a sealing mechanism. The chassis has a through portion. The voice receiving unit is assembled on an inner surface of the chassis. The sealing mechanism comprises a sealing body and a sealing ring. The sealing body has an accommodation portion and a channel, one of two ends of the channel is in communication with the accommodation portion, and the other end of the channel has a first opening. The accommodation portion accommodates the voice receiving unit. The sealing ring is between the sealing body and the acoustic membrane and is connected to the sealing body, and a ring hardness of the sealing ring is less than a body hardness of the sealing body.

Besides, according to one or some embodiments, a sealing mechanism comprises a sealing body and a sealing ring. The sealing body has an accommodation portion and a channel, one of two ends of the channel is communication with the accommodation portion, and the other end of the channel has a first opening. The sealing ring is around the first opening, and is connected to the sealing body. A ring hardness of the sealing ring is less than a body hardness of the sealing body.

In conclusion, according to any one or some embodiments, the sealing mechanism or the electronic device comprising the sealing mechanism has a good sealing capability and improved acoustic features as well.

Detailed features and advantages of the present invention are described in detail in the following implementations, and the content of the implementations is sufficient for a person skilled in the art to understand and implement the technical content of the present invention. A person skilled in the art can easily understand the objectives and advantages related to the embodiments of the present invention according to the contents disclosed in this specification, the claims, and the drawings.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

The following drawings are supplemented to describe embodiments of the present invention more clearly.

Figure 1:
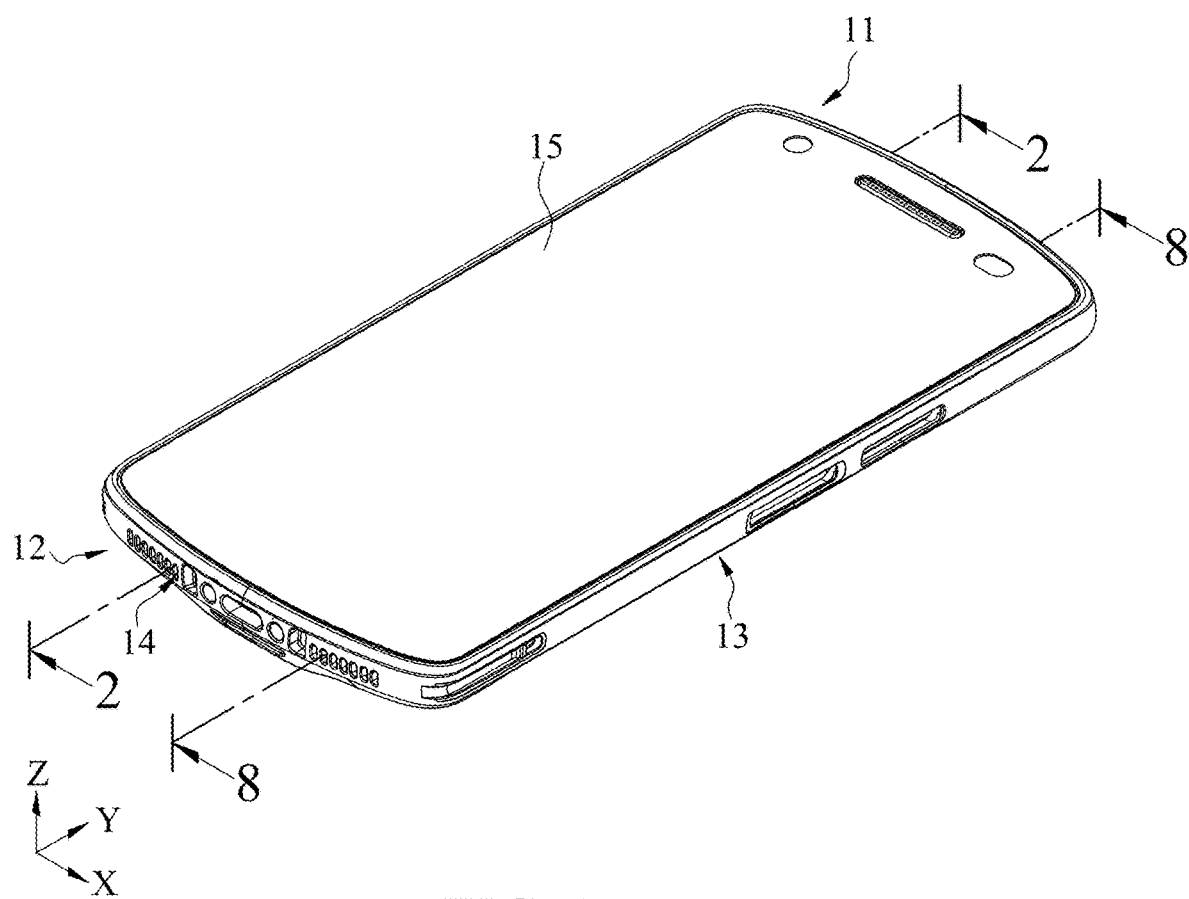
FIG. 1 illustrates a perspective view of an electronic device according to some embodiments.
Figure 2:
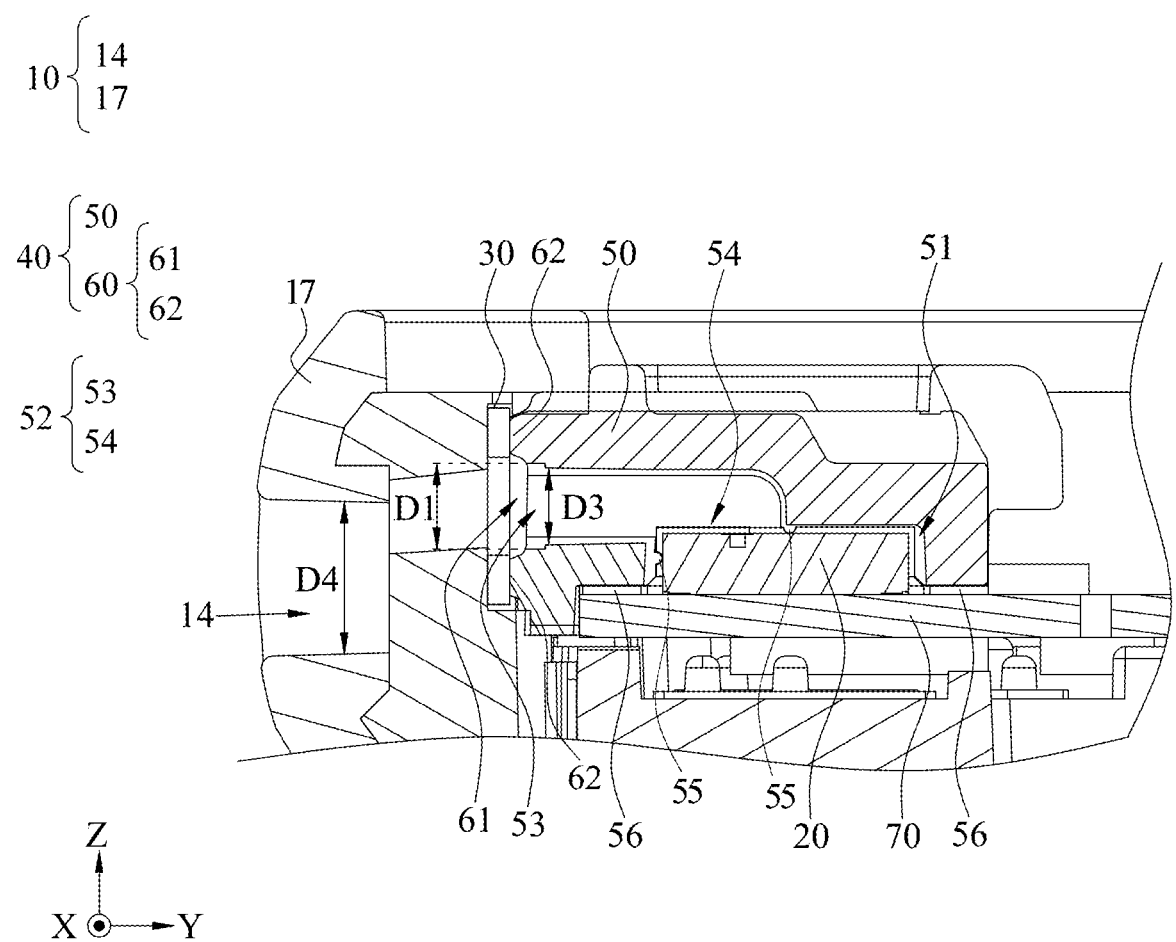
FIG. 2 illustrates a partial cross-sectional view of FIG. 1 at a position 2-2, showing the position of a sealing mechanism on an inner surface of a chassis, according to some embodiments.

Please refer to FIG. 1 and FIG. 2. FIG. 1 illustrates a perspective view of an electronic device according to some embodiments. FIG. 2 illustrates a partial cross-sectional view of FIG. 1 at a position 2-2, showing the position of a sealing mechanism on an inner surface of a chassis, according to some embodiments.

According to one or some embodiments, an electronic device comprises a chassis 10, a voice receiving unit 20, an acoustic membrane 30, and a sealing mechanism 40. The sealing mechanism 40 comprises a sealing body 50 and a sealing ring 60. The sealing ring 60 is between the sealing body 50 and the acoustic membrane 30. The sealing ring 60 is connected to the sealing body 50. The sealing body 50 accommodates the voice receiving unit 20.

In some embodiments, an electronic device may be but not limited to be a mobile device (such as a smart phone, a tablet, or a notebook computer), earphones, a speaker, an acoustic device, an audio recorder, a microphone, a micro-electro-mechanical-system (MEMS) microphone, or devices with audio playback units or audio receiving units. In the following description, the smart phone is taken as the electronic device for an illustrative example.

Referring to FIG. 1 and FIG. 2, in some embodiments, the chassis 10 may accommodate a panel 15, a speaker (not shown in figures), a voice receiving unit 20, and a circuit board 70 (shown in FIG. 2) of the smart phone. The circuit board 70 and the voice receiving unit 20 are electrically connected to each other (not shown in figures).

Referring to FIG. 1, in some embodiments, the chassis 10 comprises an upper portion 11, a bottom portion 12, and a rear portion 13. The position of the panel 15 and the position of the rear portion 13 of the chassis 10 are symmetrical relative to the Y axis of FIG. 1.

Referring to FIG. 2, the chassis 10 has a through portion 17. The through portion 17 has a through hole 14. In some embodiments, the through hole 14 may be an audio input hole or an audio output hole of the smart phone.

Referring to FIG. 2, in some embodiments, the voice receiving unit 20 is assembled on an inner surface of the chassis 10. In some embodiments, the voice receiving unit 20 may be a microphone configured in the smart phone.

In some embodiments, the acoustic membrane 30 may be a waterproof and/or dustproof fabric. For example, the acoustic membrane 30 is a non-metal fabric and has meshes. The non-metal fabric may be made of paper, cloth, plastic materials, carbon fiber fabric, or polytetrafluoroethylene (ePTFE) films. Alternatively, in some embodiments, the acoustic membrane 30 may be an elastic metal fabric containing copper or zinc. The metal fabric is adapted to filter ambient noise at specific frequency/frequencies. For example, hissing noise of high frequency will be filtered and be not recorded by the electronic device.

Referring to FIG. 2, in some embodiments, the sealing ring 60 may be fixed on the sealing body 50 or sandwiched between the sealing body 50 and the acoustic membrane 30.

Referring to FIG. 2, in some embodiments, the sealing body 50 has an accommodation portion 51 and a channel 52.

The accommodation portion 51 accommodates the voice receiving unit 20. In some embodiments, the accommodation portion 51 may accommodate the voice receiving unit 20 in whole or in part.

Figure 3:
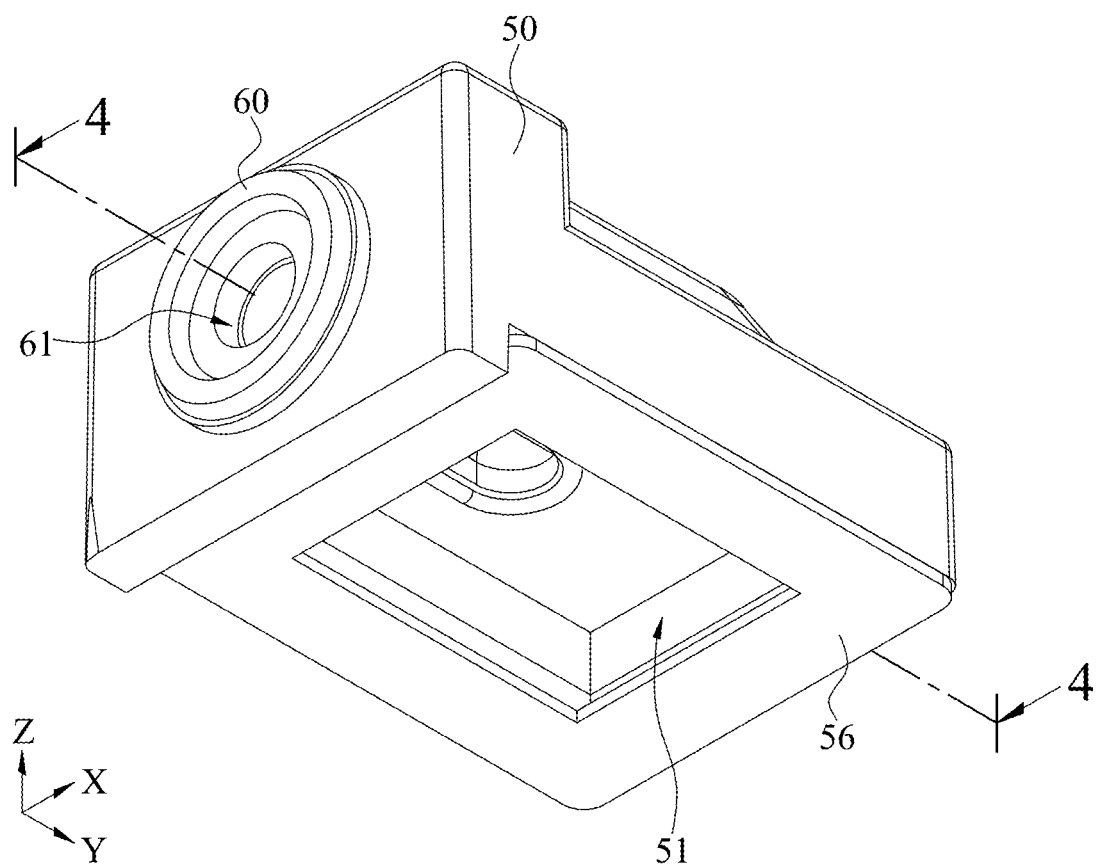
FIG. 3 illustrates a perspective view of a sealing mechanism according to some embodiments.
Figure 4:
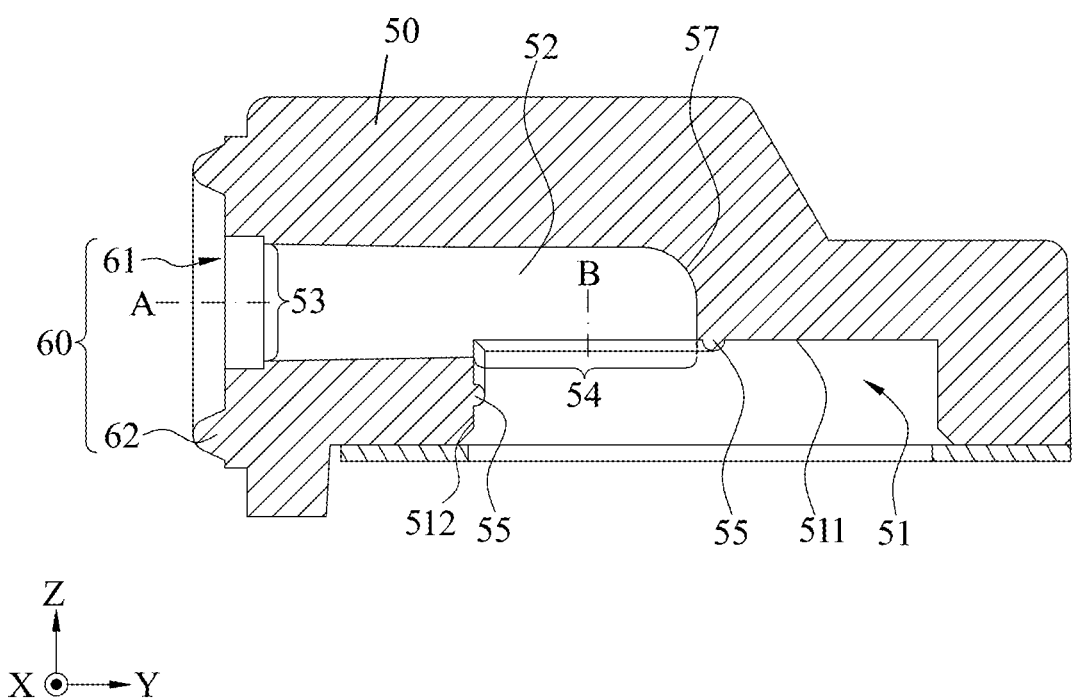
FIG. 4 illustrates a cross-sectional view of FIG. 3 at a position 4-4, showing a sealing mechanism with a channel in turning type, according to some embodiments.

Please refer to FIG. 3 and FIG. 4. FIG. 3 illustrates a perspective view of a sealing mechanism according to some embodiments. FIG. 4 illustrates a cross-sectional view of FIG. 3 at a position 4-4, showing a sealing mechanism with a channel in turning type, according to some embodiments.

Referring to FIG. 4, in some embodiments, one of two ends of the channel 52 is in communication with the accommodation portion 51, and the other end of the channel 52 has a first opening 53. For example, in FIG. 4, one end of the channel 52 is a second opening 54, and the other end of the channel 52 is the first opening 53. The channel 52 is in communication with the accommodation portion 51 through the second opening 54.

In some embodiments, a hardness of the sealing ring 60 is less than a hardness of the sealing body 50. That is, in this embodiment, by adopting the same hardness measurement, the hardness result of the sealing ring 60 is less than the hardness result of the sealing body 50. For example, when the hardness is shown in scale of ball indentation hardness (H358/30) by adopting ISO 2039-1 method measurement, the hardness of the sealing body 50 is about 90 MPa (Mega Pascal), and the hardness of the sealing ring 60 is greater than 0 MPa and less than 90 MPa.

Besides, referring to FIG. 4, according to one or some embodiments, a sealing mechanism 40 comprises a sealing body 50 and a sealing ring 60. The sealing body 50 has an accommodation portion 51 and a channel 52. One of two ends of the channel 52 is in communication with the accommodation portion 51, and the other end of the channel 52 has a first opening 53. The sealing ring 60 is around the first opening 53. The sealing ring 60 and the sealing body 50 are connected to each other, and a ring hardness of the sealing ring 60 is less than a body hardness of the sealing body 50. Herein, the relationship between the sealing body 50 and the sealing ring 60 of the sealing mechanism 40 is as mentioned above and not repeated.

Referring to FIG. 2, in some embodiments, the mechanism 40 directly contacts the acoustic membrane 30 so to reduce incidence of misalignment of matching positions among the plurality of stacked parts. Moreover, in some embodiments, the sealing body 50 with greater hardness is able to resist against forces from various directions, for example, the gravity of parts from at the Z axis of FIG. 2 (like the weight gravity of panels) and the pressing force from the Y axis of FIG. 2. Accordingly, the sealing mechanism 40 has a good sealing capability and is also able to keep the channel from deformation. Therefore, the electronic device with improved acoustic features can be provided.

Referring to FIG. 3, in some embodiments, the sealing ring 60 is fixed on the sealing body 50. The sealing ring 60 and the sealing body 50 are integrally formed as a one-piece member. In some embodiments, the sealing mechanism 40 is manufactured by liquid injection molding system (LIMS) process to have two different hardness, and the hardness of the sealing ring 60 is less than the hardness of the sealing body 50. The sealing ring 60 may be made of natural rubber, for example, or the sealing ring 60 may be made of synthetic rubber with the hardness between 10 Shore A and 70 Shore A. Preferably, in one embodiment, the synthetic rubber is liquid silicon rubber with the hardness of 60 Shore A. The sealing body 50 may be made of plastic, thermoplastic, hard resin, hard plastic, or opaque (polycarbonate, PC)-siloxane copolymer resin. Accordingly, since the structure of the sealing body 50 and the sealing ring 60 are integrally formed as a one-piece member, the number of parts for an electronic device can be reduced. Therefore, during the assembling electronic device, advantages of convenient assembly and low cost can be provided.

Referring to FIG. 2, in some embodiments, the sealing ring 60 has a penetration hole 61. The through portion 17 has a through hole 14. The penetration hole 61, the through hole 14, and the first opening 53 correspond to each other. In other words, the penetration hole 61 of the sealing mechanism 40 and the through portion 17 of the chassis 10 correspond to each other. Specifically, in this embodiment, the description "the penetration hole 61, the through portion 17, and the first opening 53 correspond to each other" may be referred to that the areas enclosed by the penetration hole 61, the through hole 14, and the first opening 53 are overlapped with each other completely or partially. In the embodiment of partial overlapping, at least a coverage area may exist, wherein the coverage area is collectively overlapped by the areas enclosed by the penetration hole 61, the through hole 14, and the first opening 53. For example, in FIG. 2, the diameter D1 represents a diameter of the penetration hole 61 of the sealing mechanism 40, the diameter D3 represents a diameter of the first opening 53, and the diameter D4 represents a diameter of the through hole 14. The diameter D1, the diameter D4, and the diameter D3 may be different. The penetration hole 61, the through hole 14, and the first opening 53 correspond to each other, that is, the areas defined by the diameters D1, D3, D4 overlap partially.

Besides, referring to FIG. 2, in some embodiments, the sealing ring 60 is made of foam and is between the sealing mechanism 40 and the acoustic membrane 30. The sealing ring 60 made of foam and the sealing body 50 are two detachable parts. In some embodiments, the sealing ring 60 may be provided with the penetration hole 61. In some embodiments, the sealing ring 60 may be in a sheet form (without the penetration hole 61) sandwiched between the sealing body 50 and the acoustic membrane 30. In some embodiments, the hardness of foam is less than the hardness of the sealing body 50, so that the foam is able to buffer the pressure from the sealing body 50 toward the acoustic membrane 30, resulting in providing a sealing effect. Moreover, the hardness of foam and the hardness of the sealing body 50 are adjustable depending on the actual assembly requirements.

Referring to FIG. 4, in some embodiments, the sealing ring 60 has an outward protrusion 62. The outward protrusion 62 protrudes in a direction toward the chassis 10 (shown in FIG. 2). For example, the outward protrusion 62 protrudes in a direction opposite to the sealing body 50, that is, −Y axis direction of FIG. 4. In FIG. 2, the outward protrusion 62 contacts the acoustic membrane 30 in a manner of tightly fitting. Accordingly, the sealing ring 60 is able to contact the acoustic membrane 30 in the manner of tightly fitting and to provide a good sealing capability.

In some embodiments, the outward protrusion 62 contacts the acoustic membrane 30 in the manner of tightly fitting and has an interference size therein, and the interference size of the outward protrusion 62 is between 0.15 mm and 0.25 mm. Therefore, in this embodiment, grooves or fasten parts are not configured on the chassis 10 for fixing the positions of the sealing mechanism 40, the acoustic membrane 30, and the chassis 10, thus resulting in reducing assembling cost.

Besides, in some embodiments, the sealing ring 60 and the sealing body 50 are detachably connected to each other through fasten parts. The fasten parts may be components for clamping, buckling, hooking, or tightly fitting.

Figure 5:
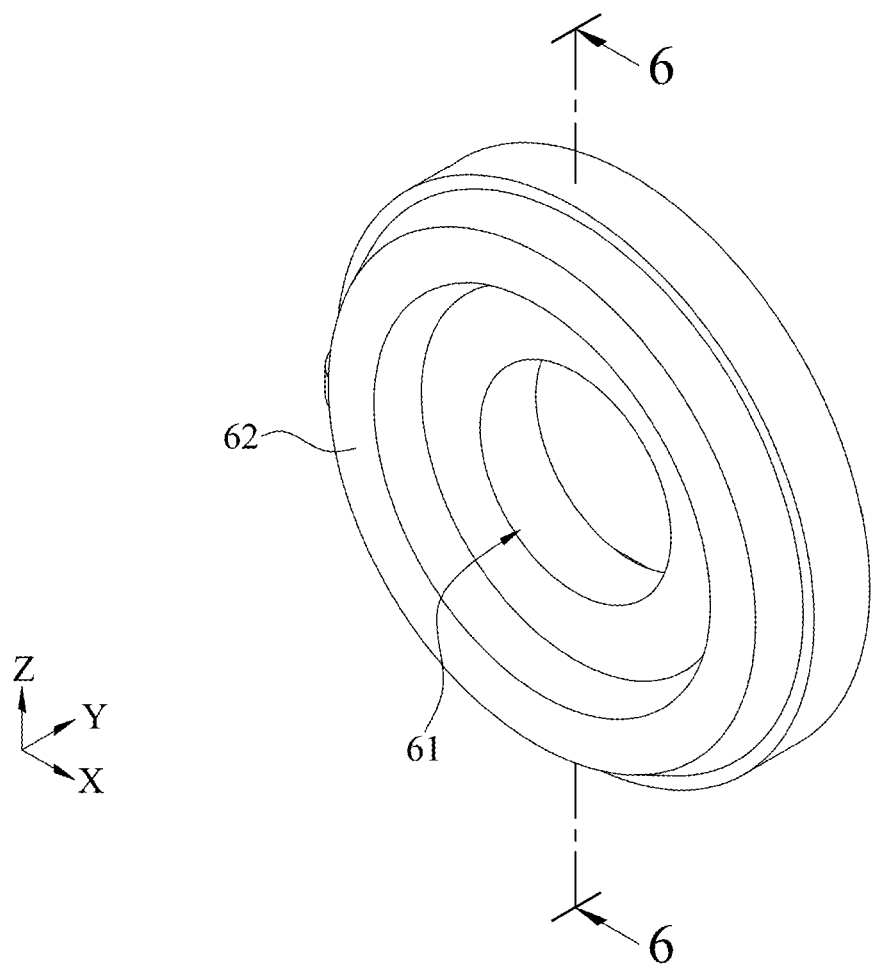
FIG. 5 illustrates a perspective view of a sealing ring according to some embodiments.
Figure 6:
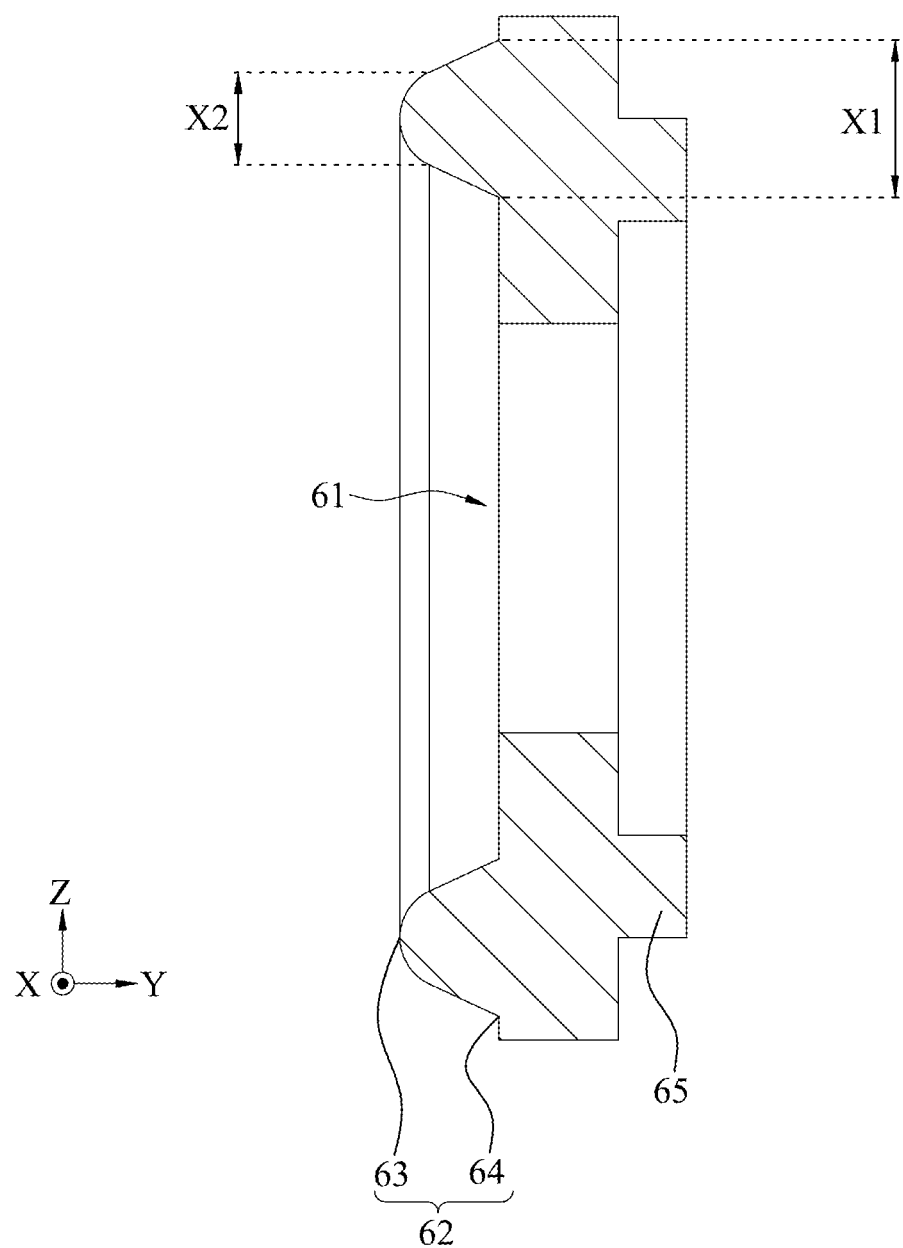
FIG. 6 illustrates a cross-sectional view of FIG. 5 at a position 6-6 according to some embodiments.

Please refer to FIG. 5 and FIG. 6. FIG. 5 illustrates a perspective view of a scaling ring according to some embodiments. FIG. 6 illustrates a cross-sectional view of FIG. 5 at a position 6-6 according to some embodiments.

Referring to FIG. 6, in some embodiments, the sealing ring 60 comprises a docking protrusion 65. The docking protrusion 65 surrounds on one side of the sealing ring 60, and the protruding direction of the docking protrusion 65 is substantially opposite to the protruding direction of the outward protrusion 62. The sealing ring 60 is connected to the sealing body 50 through the docking protrusion 65. In some embodiments, the sealing body 50 has a docking groove (not shown in the figures) corresponding to the docking protrusion 65. The docking groove surrounds on an outer part of the first opening 53, which is the surface of the sealing body 50 contacting the sealing ring 60. The docking protrusion 65 and the docking groove are connected to each other in a manner of engagement. In some embodiments, the docking protrusion 65 and the docking groove may be in the shape of dovetail groove, one-sided trapezoid, or two-sided trapezoid.

Referring to FIG. 6, in some embodiments, a base width X1 of the outward protrusion 62 may be equal to a top width X2 of the outward protrusion 62.

Additionally, in some embodiments, a base width X1 of the outward protrusion 62 may be greater than a top width X2 of the outward protrusion 62. For example, in the embodiment shown in FIG. 6, the outward protrusion 62 has a base 64 and a top 63. The base width X1 of the base 64 along the Z axis is greater than the top width X2 of the top 63 along the Z axis. In some embodiments, from the viewing angle of −X axis direction of FIG. 6, the cross-section of the outward protrusion 62 is in shape of hill with gentle slopes. Because the base 64 is wider than the top 63, the base 64 is able to withstand greater pressure and reduce deformation of the sealing ring 60, thereby improving the sealing performance. Moreover, the highness of the outward protrusion 62 (namely the distance between the top 63 and the base 64 along the Y axis of FIG. 6) may be flexibly adjusted based on various configurations of the chassis 10.

Figure 7:
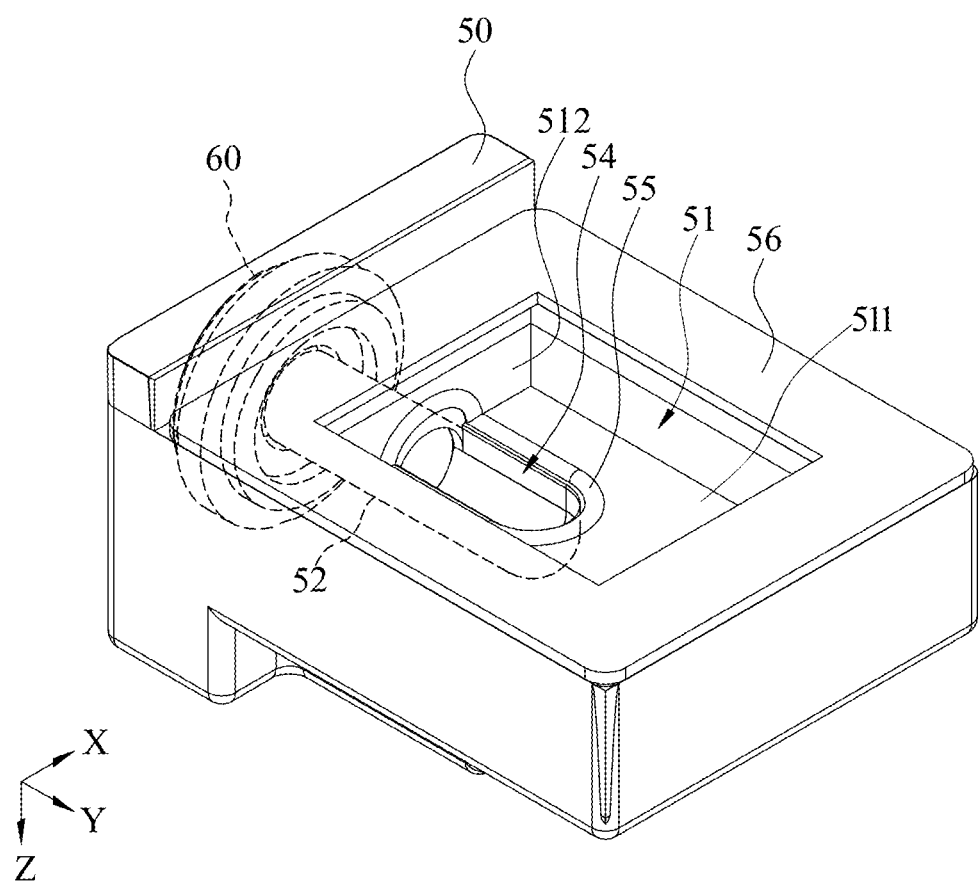
FIG. 7 illustrates a perspective view from another viewing angle of an embodiment of FIG. 3, showing the position of a buffering portion in the accommodation portion.

In addition, please refer to FIG. 4 and FIG. 7. FIG. 7 illustrates a perspective view from another viewing angle of an embodiment of FIG. 3, showing the position of a buffering portion in the accommodation portion.

Referring to FIG. 7, in some embodiments, the sealing body 50 further comprises a buffering portion 55 surrounding the second opening 54. Referring to FIG. 2, in some embodiments, the buffering portion 55 contacts the voice receiving unit 20 in the manner of tightly fitting or force fitting. Specifically, referring to FIG. 7, in some embodiments, the second opening 54 is configured at two connecting side walls 511 and 512 of the accommodation portion 51. The buffering portion 55 surrounds the second opening 54 and protrudes in a direction toward the accommodation portion 51. In some embodiments, the side wall 511 and the side wall 512 are perpendicularly connected to each other. The buffering portion 55 is thus correspondingly configured as a L-shape structure. In some embodiments, the buffering portion 55 between the channel 52 and the accommodation portion 51. Therefore, the acoustic wave is transferred from the channel 52 to an audio input hole of the voice receiving unit 20. Accordingly, the acoustic waves can be effectively collected as sound input and do not disperse in the accommodation portion 51. From the other hand, the buffering portion 55 is also able to withstand the vibration of the voice receiving unit 20 so to maintain the position of the voice receiving unit 20 relative to the sealing mechanism 40.

Referring to FIG. 2, in some embodiments, the sealing body 50 further comprise an adhesive film 56 adhered to the circuit board 70. The thickness of the adhesive film 56 is between 0.15 mm and 0.25 mm. Referring to FIG. 7, in some embodiments, the adhesive film 56 is adhered around the second opening 54, and between the sealing body 50 and the circuit board 70 (shown in FIG. 2). Therefore, by adopting various thickness of the adhesive film 56, the sealing mechanism 40 is able to provide suitable sealing for the voice receiving unit 20 with various thickness.

Referring to FIG. 4, in some embodiments, the first opening 53 has a first axis A, and the second opening 54 has a second axis B. An included angle between the first axis A and the second axis B is in a range between 70 degrees and 110 degrees.

Referring to FIG. 4, in some embodiments, the channel 52 of the sealing mechanism 40 is in turning type. The channel 52 has a turning portion 57. One of two ends of the turning portion 57 is in communication with the second opening 54, and the other end of the turning portion 57 extends toward the first opening 53. The first axis A is a center line of the first opening 53. The second axis B is a center line of the second opening 54. The first axis A is substantially perpendicular to the second axis B. In some embodiments, the second axis B substantially perpendicular to the voice receiving unit 20.

Figure 8:
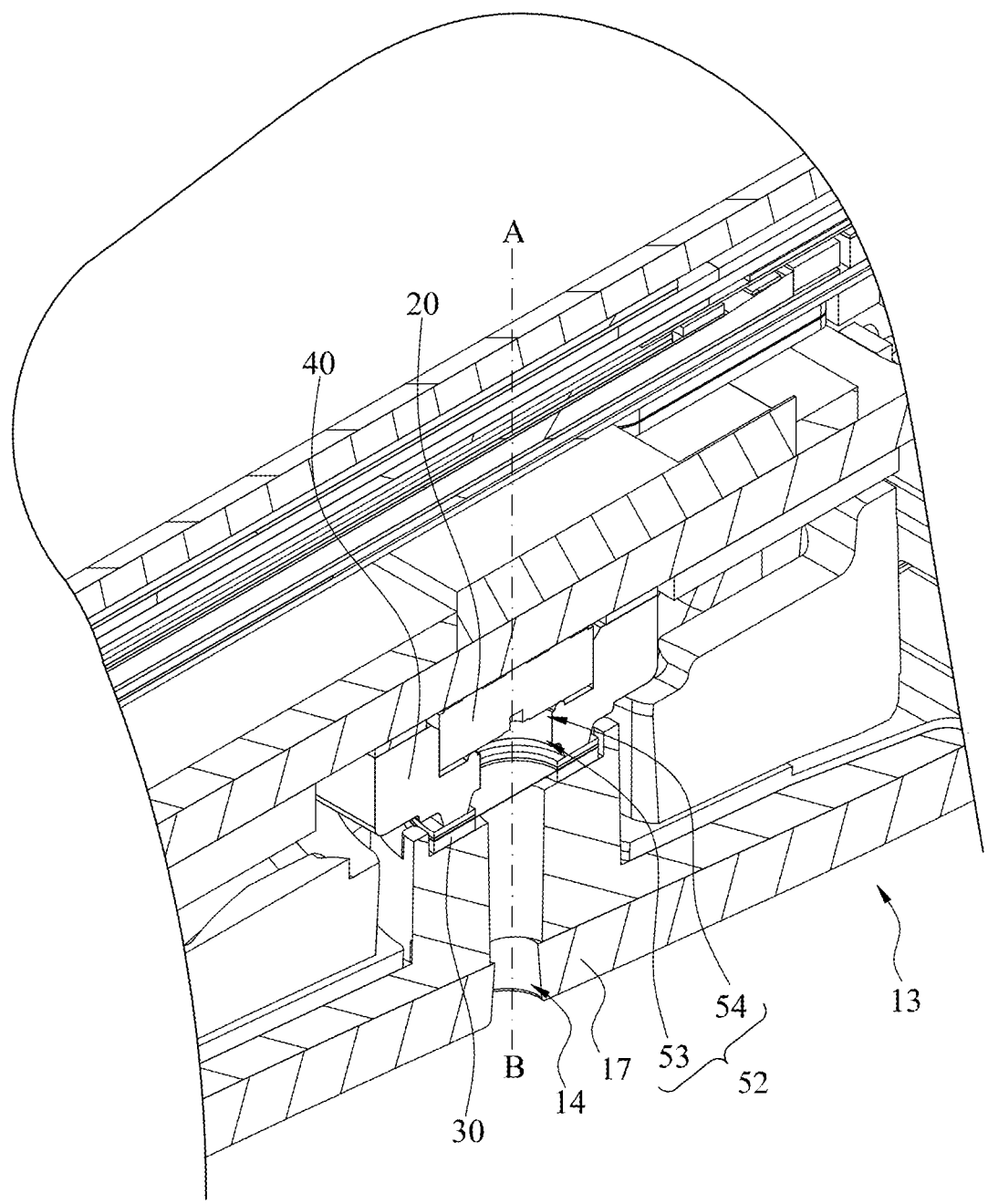
FIG. 8 illustrates a partial cross-sectional view of FIG. 1 at a position 8-8, showing the sealing mechanism with a channel in linear type, and the position of the sealing mechanism on the inner surface of a chassis, according to some embodiments.

Please refer to FIG. 8. FIG. 8 illustrates a partial cross-sectional view of FIG. 1 at a position 8-8, showing the sealing mechanism with a channel in linear type, and the position of the sealing mechanism on the inner surface of the chassis, according to some embodiments.

Referring to FIG. 8, in some embodiments, the first opening 53 has a first axis A, and the second opening 54 has a second axis B. The first axis A is substantially parallel to the second axis B. For example, in FIG. 8, the channel 52 of the sealing mechanism 40 is in linear type. Both the first axis A and the second axis B are perpendicular to the voice receiving unit 20.

Acoustic Performance Test

The acoustic performance of the microphones assembled at different positions of the smart phone (namely the microphones assembled on the inner surfaces of the chassis 10 at the positions of the upper portion 11, the bottom portion 12, and the rear portion 13 shown in FIG. 1) are measured by the following tests. According to the materials of the sealing mechanism 40, the microphones are divided into the control group and the experimental group. Further, the control group is divided into the control group A, control group 1, control group 2, and control group 3, and the experimental group is divided into the experimental group A, experimental group 1, experimental group 2, and experimental group 3. In the control group A and the experimental group A, the smart phone with the microphones at the positions of the upper portion 11, the bottom portion 12, and the rear portion 13 is measured in whole. In the control group 1 and experimental group 1, the microphone at the position of the upper portion 11 is measured. In the control group 2 and the experimental group 2, the microphone at the position of the bottom portion 12 is measured. In the control group 3 and the experimental group 3, the microphone at the position of the rear portion 13 is measured. Herein, in the control group 1, the control group 2, the experimental group 1, and the experimental group 2, the sealing body 50 of the sealing mechanism 40 has the channel 52 in turning type shown in FIG. 4, and the microphones (the voice receiving unit 20) and the corresponding sealing mechanism 40 are substantially with the same structures as the embodiment shown in FIG. 2. In the control group 3 and the experimental group 3, the sealing body 50 of the sealing mechanism 40 has the channel 52 in linear type shown in FIG. 8, and the microphones (the voice receiving unit 20) and the corresponding sealing mechanism 40 are substantially with the same structures as the embodiment shown in FIG. 8.

In the control group, the material of the sealing mechanism 40 is homogenous and is liquid silicon rubber.

In the experimental group, the sealing mechanism 40 is manufactured by liquid injection molding system (LIMS) process to have two different hardness. The sealing ring 60 is made of liquid silicon rubber with the hardness of 60 Shore A. The sealing body 50 is made of opaque (polycarbonate, PC)-siloxane copolymer resin. The hardness of the sealing ring 60 is less than the hardness of the sealing body 50.

The sealing ring 60 of each group has the interference size. The interference size of the sealing ring 60 and the thickness of the adhesive film 45 for each group are shown in table 1.

TABLE 1

|  | Control group 1 | Experimental group 1 | Control group 2 | Experimental group 2 | Control group 3 | Experimental group 3 |
|---|---|---|---|---|---|---|
| Interference size | 0.15 mm | 0.15 mm | 0.15 mm | 0.15 mm | 0.25 mm | 0.25 mm |
| Thickness | 0.25 mm | 0.25 mm | 0.15 mm | 0.15 mm | 0.25 mm | 0.25 mm |

1. Receiving Idle Channel Noise, Max Vol Test

Figure 9:
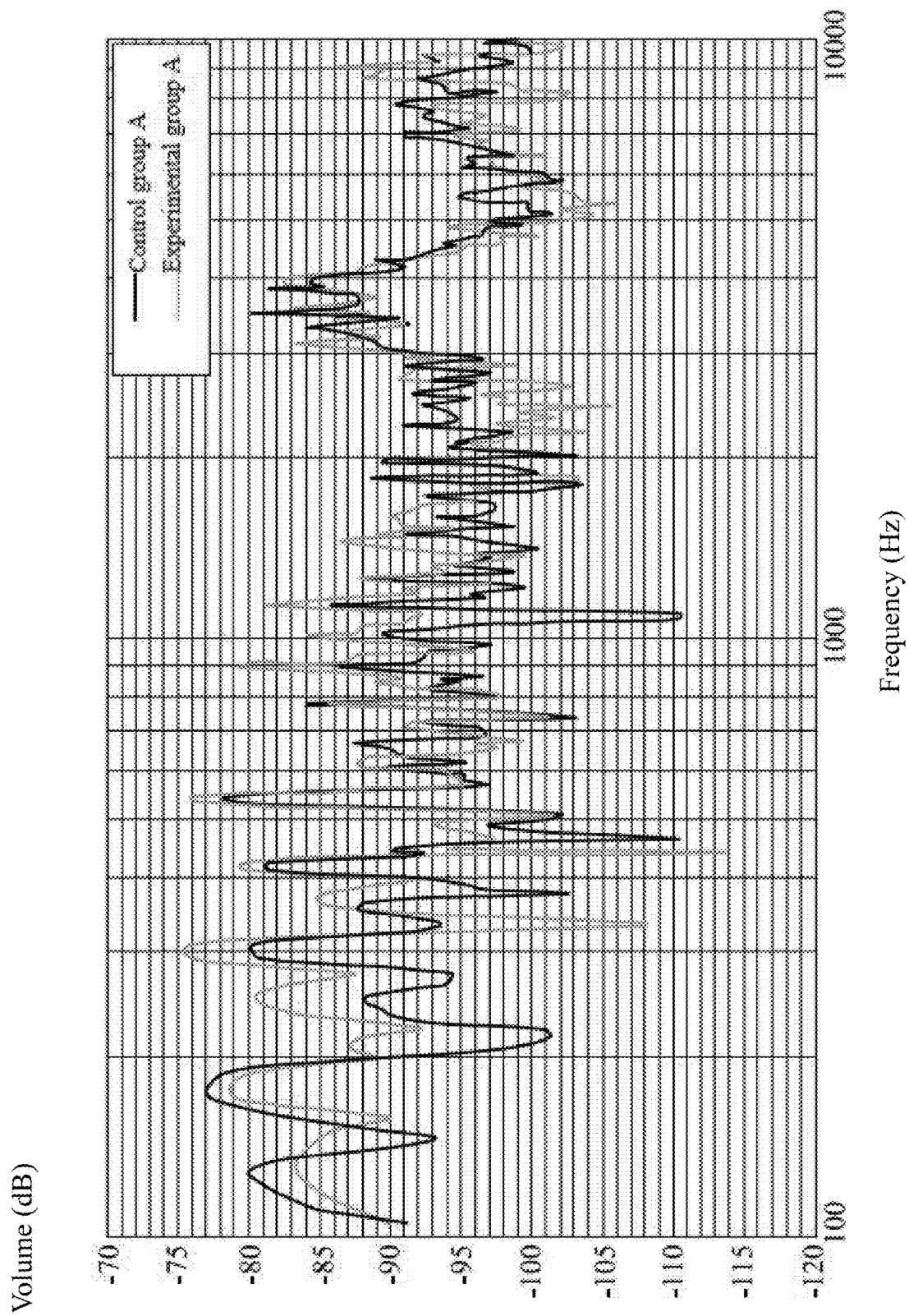
FIG. 9 illustrates a graph of comparison in the results of receiving idle channel noise, Max vol. test.

FIG. 9 illustrates a graph of comparison in the results of receiving idle channel noise, Max vol. test.

According to FIG. 9, the control group A and the experimental group A both comply with the requirement of idle channel noise regulated by the 3rd Generation Partnership Project (3GPP).

2. Hissing Noise Sensitivity Test

The noise recorded by the microphones of each group is under three scenarios, that is, the scenario of the electronic device at a stand-by mode, the scenario of using the camera application, and the scenario of recording a video. The noise is recorded and analyzed by Tinycap software and Tinymix software.

Figure 10:
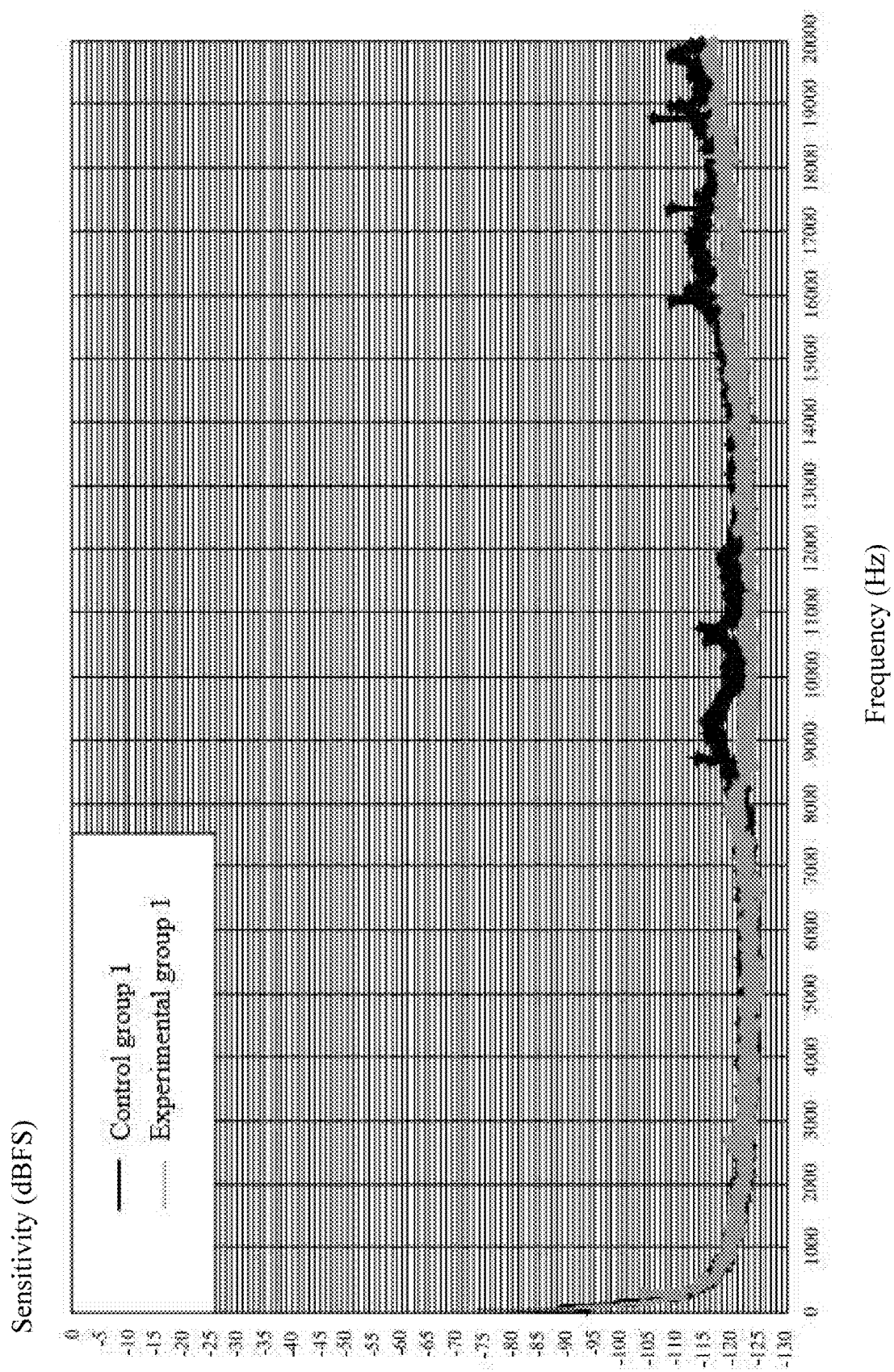
FIG. 10 illustrates a graph showing the results of the experimental group 1 of hissing noise sensitivity test under the scenario of the electronic device at a stand-by mode.
Figure 11:
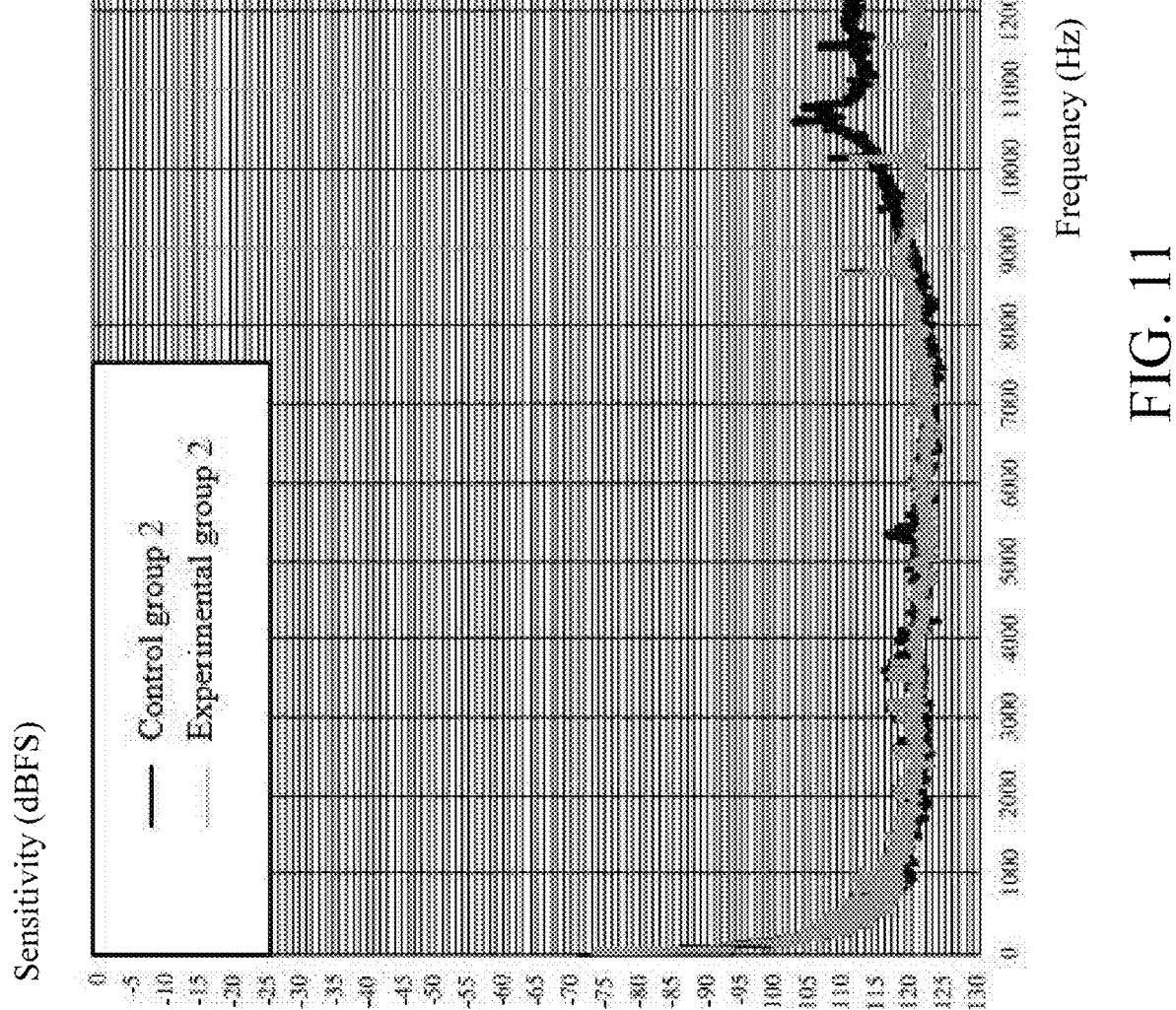
FIG. 11 illustrates a graph showing the results of the experimental group 2 of hissing noise sensitivity test under the scenario of the electronic device at the stand-by mode.

FIG. 10 illustrates a graph showing the results of the experimental group 1 of hissing noise sensitivity test under the scenario of the electronic device at a stand-by mode. FIG. 11 illustrates a graph showing the results of the experimental group 2 of hissing noise sensitivity test under the scenario of the electronic device at the stand-by mode. According to FIG. 10 and FIG. 11, under the scenario of the electronic device at the stand-by mode, at the frequency ranges of 8 KHz to 12 KHz and 16 KHz to 20 KHz, the frequency response of the experimental group 1 is flatter than the frequency response of the control group 1. At the frequency range of 9 KHz to 20 KHz, the frequency response of the experimental group 2 is flatter than the frequency response of the control group 2. That is, when the electronic device is at the stand-by mode, the microphones of the experimental groups record less noise. The scaling mechanisms 40 of the experimental groups with the better scaling capability can be provided.

Figure 12:
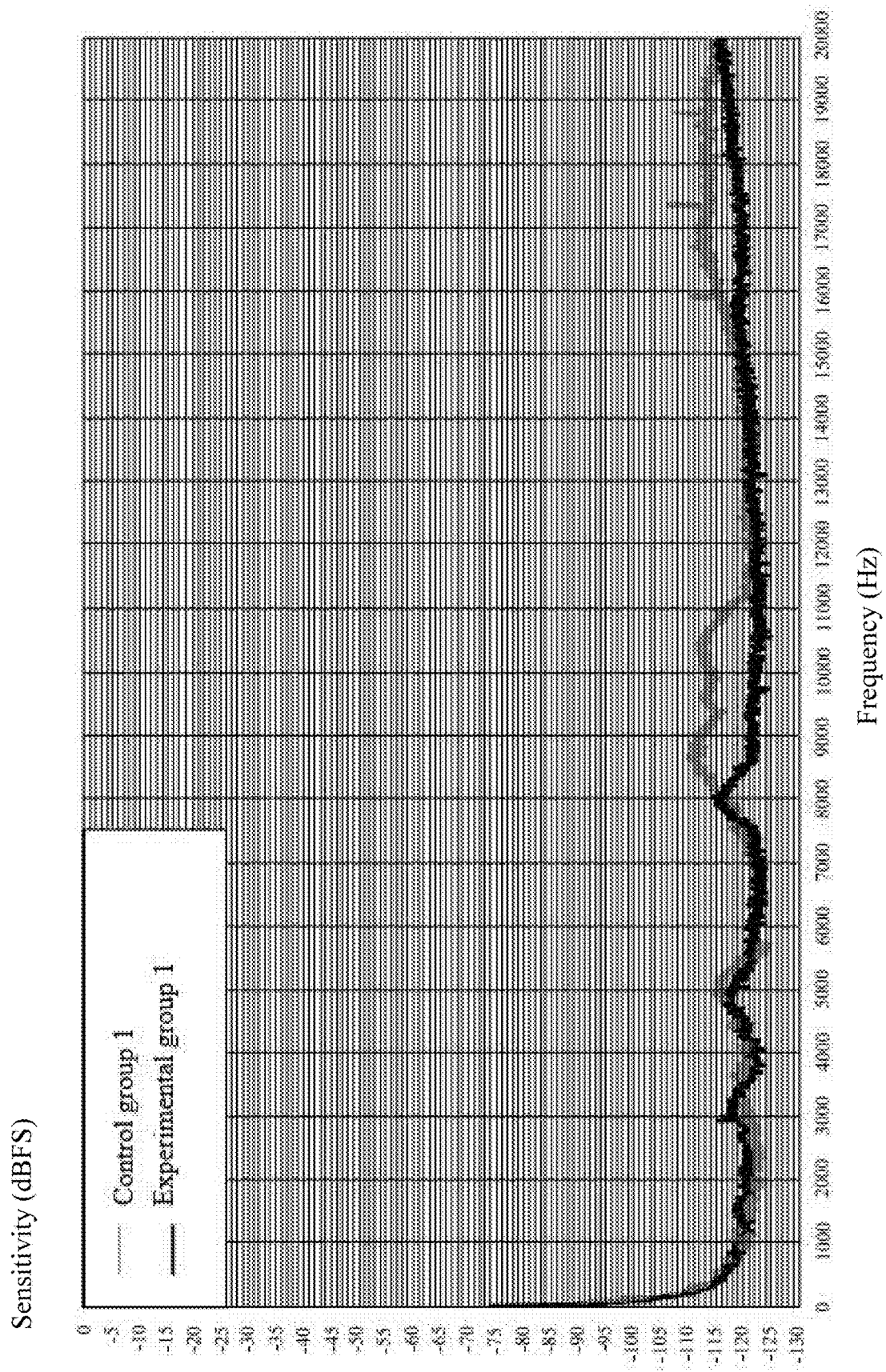
FIG. 12 illustrates a graph showing the results of the experimental group 1 of hissing noise sensitivity test under the scenario of using the camera application.
Figure 13:
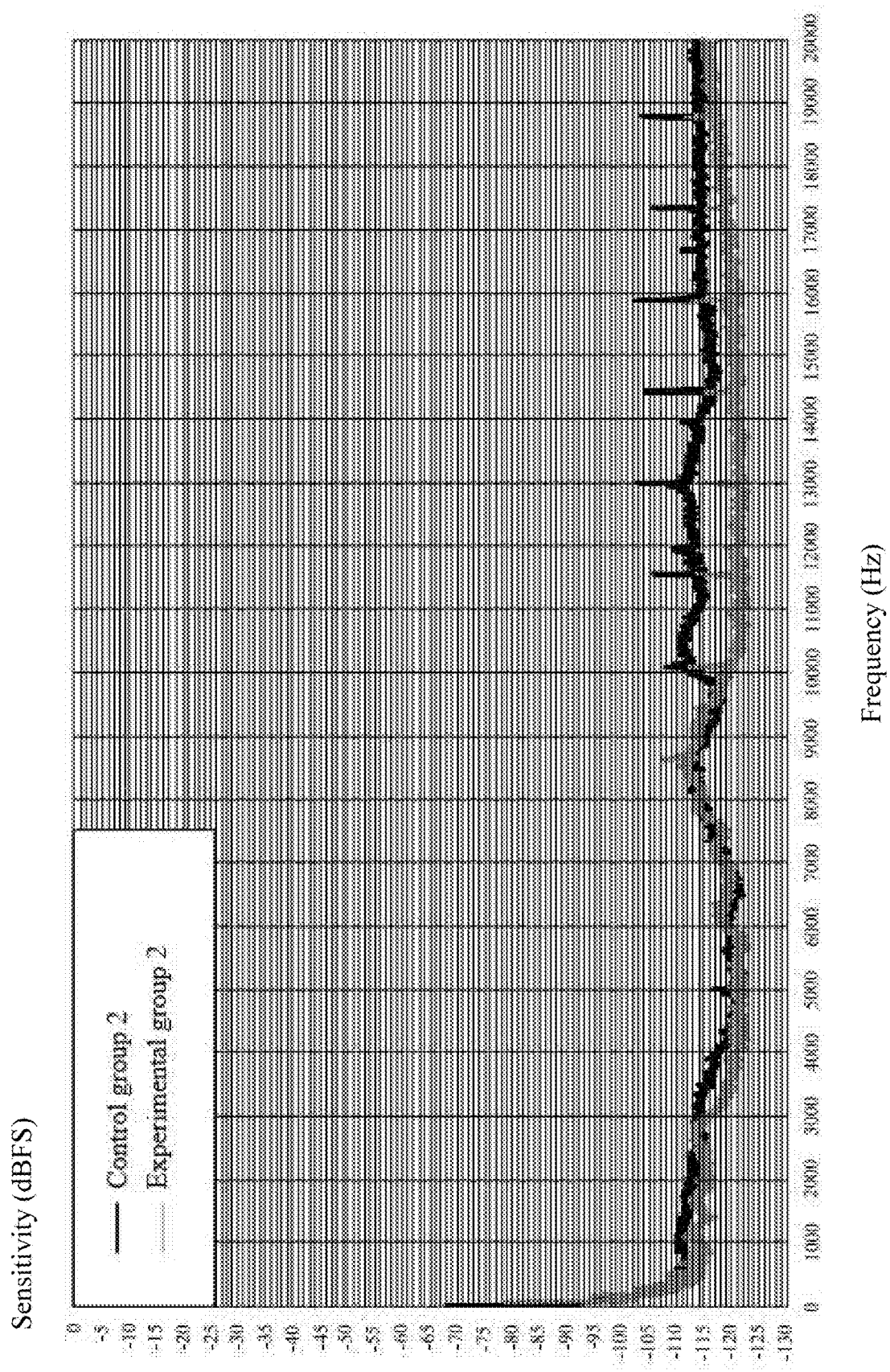
FIG. 13 illustrates a graph showing the results of the experimental group 2 of hissing noise sensitivity test under the scenario of using the camera application.

FIG. 12 illustrates a graph showing the results of the experimental group 1 of hissing noise sensitivity test under the scenario of using the camera application. FIG. 13 illustrates a graph showing the results of the experimental group 2 of hissing noise sensitivity test under the scenario of using the camera application. According to FIG. 12 and FIG. 13, under the scenario of the camera application used, at the frequency ranges of 9 KHz to 12 KHz and 16 KHz to 20 KHz, the frequency response of the experimental group 1 is flatter than the frequency response of the control group 1. At the frequency range of 9 KHz to 20 KHz, the frequency response of the experimental group 2 is flatter than the frequency response of the control group 2. That is, when the camera application is used, the microphones of experimental groups record less noise. The sealing mechanisms 40 of the experimental groups with the better sealing capability can be provided.

Figure 14:
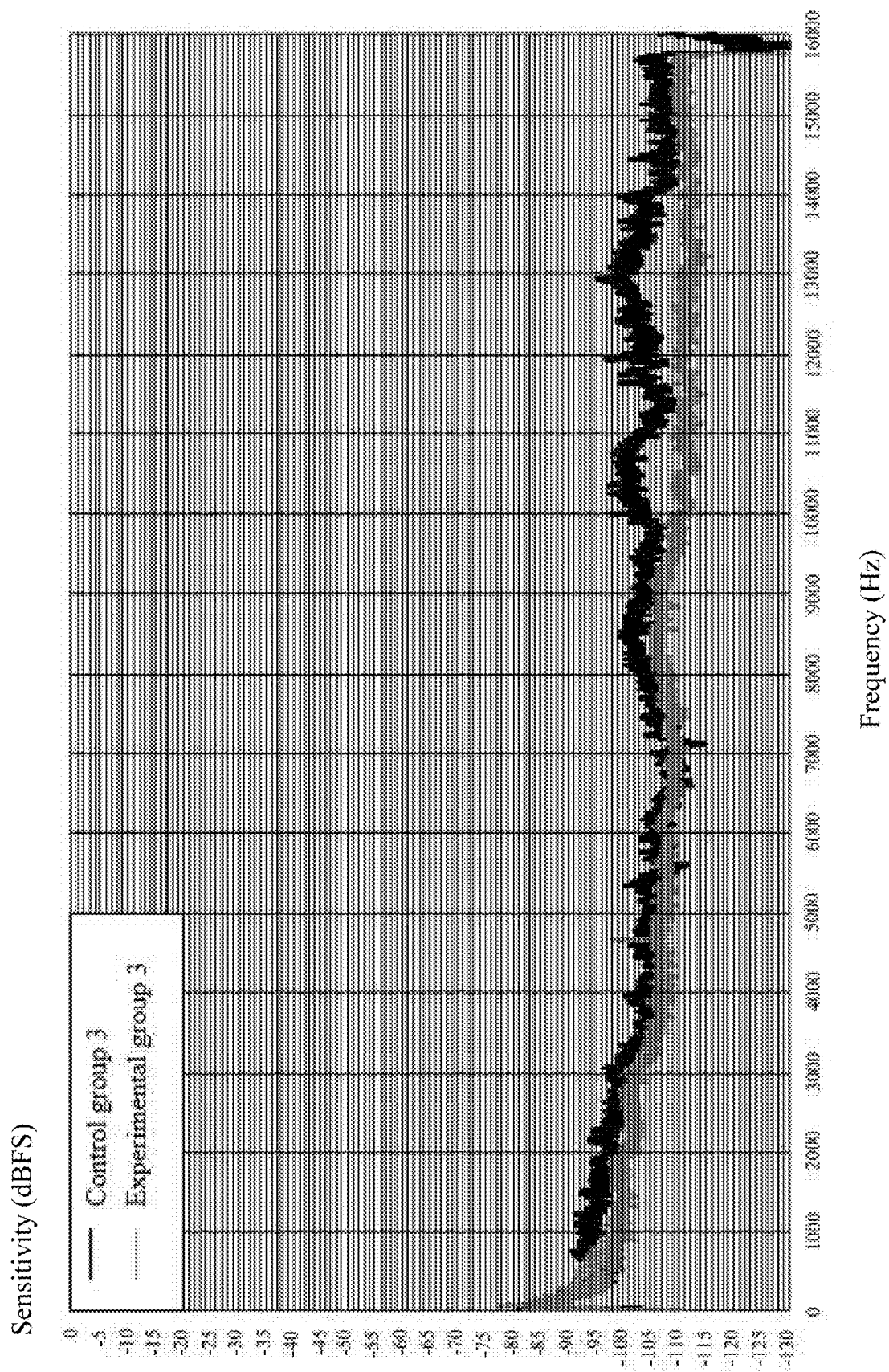
FIG. 14 illustrates a graph showing the results of the experimental group 3 of hissing noise sensitivity test under the scenario of recording a video.

FIG. 14 illustrates a graph showing the results of the experimental group 3 of hissing noise sensitivity test under the scenario of recording a video. According to FIG. 14, under the scenario of recording a video, at the frequency range of 9 KHz to 14 KHz, the frequency response of the experimental group 3 is flatter than the frequency response of the control group 3. That is, when the electronic device is recording a video, the microphones of the experimental groups record less noise. The sealing mechanisms 40 of the experimental groups with the better sealing capability can be provided.

3. Frequency Response Test

Figure 15:
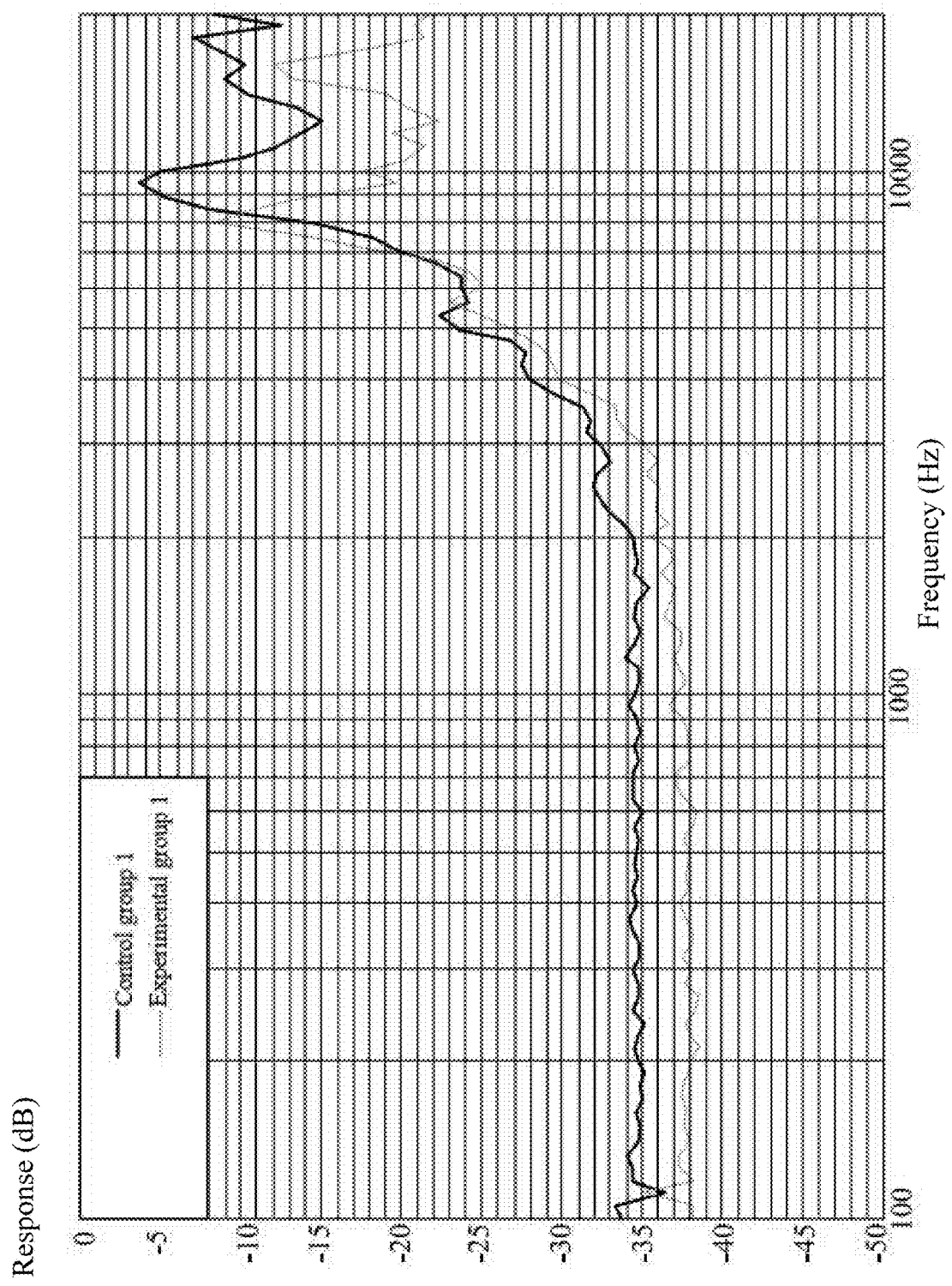
FIG. 15 illustrates a graph showing the results of the experimental group 1 of frequency response test.
Figure 16:
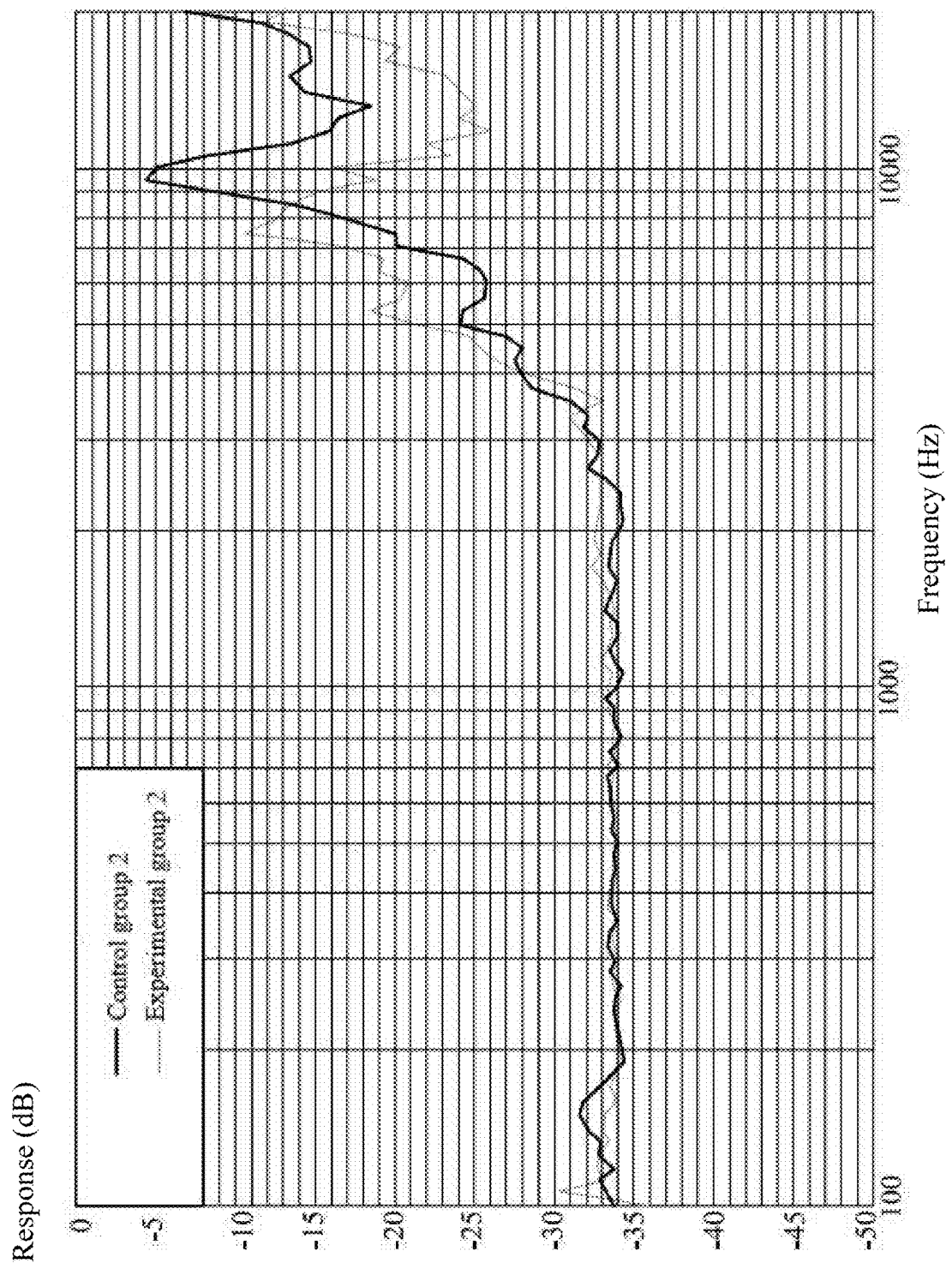
FIG. 16 illustrates a graph showing the results of the experimental group 2 of frequency response test.
Figure 17:
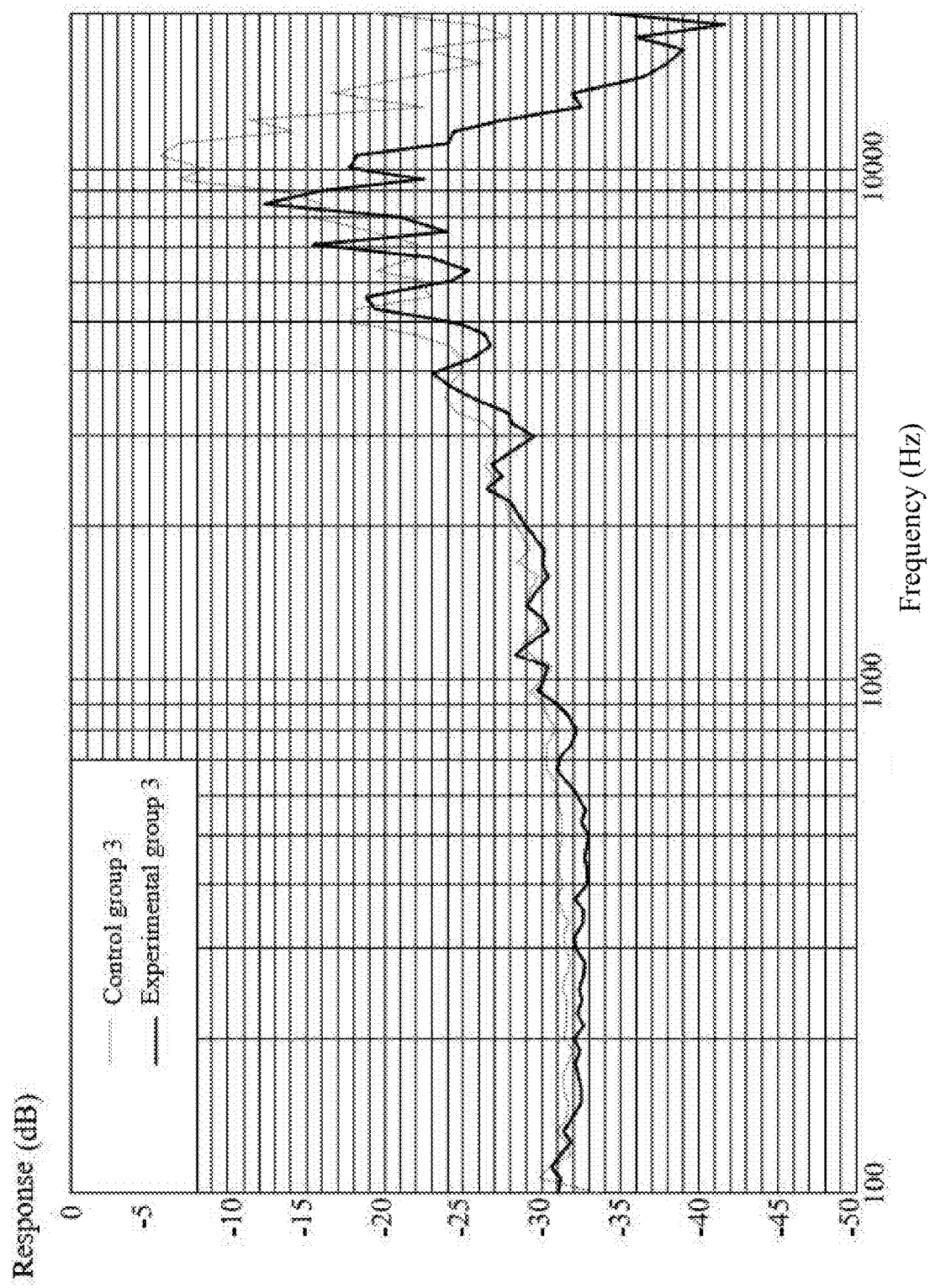
FIG. 17 illustrates a graph showing the results of the experimental group 3 of frequency response test.

FIG. 15 illustrates a graph showing the results of the experimental group 1 of frequency response test. FIG. 16 illustrates a graph showing the results of the experimental group 2 of frequency response test. FIG. 17 illustrates a graph showing the results of the experimental group 3 of frequency response test.

According to FIGS. 15, 16, and 17, the frequency of resonance peak of the experimental group 1 is shifted forward 1.5 kHz when comparing to the frequency of resonance peak of the control group 1. The frequency of resonance peak of the experimental group 2 is shifted forward 2 kHz when comparing to the frequency of resonance peak of the control group 2. The frequency of resonance peak of the experimental group 3 is shifted forward 3 kHz when comparing to the frequency of resonance peak of the control group 3.

In FIGS. 15, 16, and 17, the response curve of each experimental group is flatter than the response curve of each control group. That is, the sealing mechanisms 40 of experimental groups cause no negative effect on the acoustic performance of the microphone. Moreover, the audio recorded by the microphones configured with the sealing mechanisms 40 of the experimental groups has less distortion.

In conclusion, according to one or some embodiments, the sealing mechanism is provided with two different textures. The softer sealing ring contacts the acoustic membrane in a manner of tightly fitting so as to enhance the sealing capability; the harder sealing body is able to keep the channel from deformation, thereby causing less effects on the sound transmission. Therefore, the electronic device with improved acoustic features can be provided.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device, comprising:
a chassis having a through portion;
a voice receiving unit assembled on an inner surface of the chassis;
an acoustic membrane; and
a sealing mechanism, comprising:
a sealing body having an accommodation portion and a channel, wherein one of two ends of the channel is in communication with the accommodation portion, the other end of the channel has a first opening, and the accommodation portion accommodates the voice receiving unit; and
a sealing ring between the sealing body and the acoustic membrane, wherein the sealing ring is connected to the sealing body;
wherein a ring hardness of the sealing ring is less than a body hardness of the sealing body; and the sealing body is made of opaque polycarbonate, PC-siloxane copolymer resin.

2. The electronic device according to claim 1, wherein the ring hardness of the sealing ring is between 10 Shore A and 70 Shore A.

3. The electronic device according to claim 1, wherein the sealing ring has a penetration hole and an outward protrusion, the penetration hole, the through portion, and the first opening correspond to each other, and the outward protrusion protrudes in a direction toward the chassis and contacts the acoustic membrane in a manner of tightly fitting.

4. The electronic device according to claim 3, wherein the outward protrusion contacts the acoustic membrane in the manner of tightly fitting and has an interference size between 0.15 mm and 0.25 mm.

5. The electronic device according to claim 3, wherein a base width of the outward protrusion is greater than a top width of the outward protrusion.

6. The electronic device according to claim 1, wherein a second opening is at the end of the channel connecting to the accommodation portion, the sealing body further comprises a buffering portion surrounding the second opening, and the buffering portion contacts the voice receiving unit.

7. The electronic device according to claim 6, wherein the first opening has a first axis, the second opening has a second axis, and the first axis is substantially parallel to the second axis.

8. The electronic device according to claim 6, wherein the first opening has a first axis, the second opening has a second axis, and the first axis is substantially perpendicular to the second axis.

9. The electronic device according to claim 1, further comprising a circuit board, wherein the sealing body further comprises an adhesive film adhered to the circuit board, and a thickness of the adhesive film is between 0.15 mm and 0.25 mm.

10. The electronic device according to claim 1, wherein the sealing ring is made of foam.

11. A sealing mechanism, comprising:
a sealing body having an accommodation portion and a channel, wherein one end of two ends of the channel is in communication with the accommodation portion, and the other end of the channel has a first opening; and
a sealing ring around the first opening, wherein the sealing ring is connected to the sealing body;
wherein a ring hardness of the sealing ring is less than a body hardness of the sealing body; and the sealing body is made of opaque polycarbonate, PC-siloxane copolymer resin.

12. The sealing mechanism according to claim 11, wherein the ring hardness of the sealing ring is between 10 Shore A and 70 Shore A.

13. The sealing mechanism according to claim 11, wherein the sealing ring has a penetration hole and an outward protrusion, the penetration hole and the first opening correspond to each other, and the outward protrusion protrudes in a direction opposite to the sealing body.

14. The sealing mechanism according to claim 11, wherein the sealing ring further comprises a docking protrusion, the docking protrusion protrudes in a direction toward a contact surface between the sealing body and the sealing ring, and the sealing body is connected to the sealing ring in a manner of engagement through the docking protrusion.

15. The sealing mechanism according to claim 13, wherein a base width of the outward protrusion is greater than a top width of the outward protrusion.

16. The sealing mechanism according to claim 11, wherein the sealing ring is made of foam.

17. The sealing mechanism according to claim 11, wherein a second opening is the end of the channel connecting to the accommodation portion, and the sealing body further comprises a buffering portion surrounding the second opening.

18. The sealing mechanism according to claim 17, wherein the first opening has a first axis, the second opening has a second axis, and the first axis is substantially parallel to the second axis.

19. The sealing mechanism according to claim 17, wherein the first opening has a first axis, the second opening has a second axis, and the first axis is substantially perpendicular to the second axis.

20. The sealing mechanism according to claim 11, wherein the sealing body further comprises an adhesive film adhered around the second opening, and a thickness of the adhesive film is between 0.15 mm and 0.25 mm.

\* \* \* \* \*